United States Patent [19]

Gupta

[11] Patent Number: 5,002,757

[45] Date of Patent: Mar. 26, 1991

[54] PERFLUOROALKANES AND PERFLUOROALKANE AND SULPHUR HEXAFLUORIDE COMPOSITIONS AS AEROSOL PROPELLANTS

[76] Inventor: Chakra V. Gupta, Box 1085, Conover, N.C. 28613

[21] Appl. No.: 194,104

[22] Filed: May 16, 1988

[51] Int. Cl.$^5$ .............................. A61L 9/02; A61L 9/04
[52] U.S. Cl. ........................................ 424/41; 424/45; 252/305
[58] Field of Search ............................ 424/41, 45, 46; 252/305; 239/337

[56] References Cited

U.S. PATENT DOCUMENTS 3,051,652  2/1961  Olandt .................................. 252/305
4,352,789  10/1982  Thiel ..................................... 424/46

*Primary Examiner*—Joseph L. Schofer
*Assistant Examiner*—Jeffrey T. Smith
*Attorney, Agent, or Firm*—B. Craig Killough

[57] ABSTRACT

Perfluoroalkanes, including perfluorobutane, perfluoro propane and perfluoropentane are used in aerosol spray compositions contained within aerosol spray containers to act as propellants. Further, perfluoroalkanes are combined with sulphur hexafluoride for use as aerosol propellants. Specific examples, including insecticide formulations, are particularly set forth.

24 Claims, No Drawings

PERFLUOROALKANES AND PERFLUOROALKANE AND SULPHUR HEXAFLUORIDE COMPOSITIONS AS AEROSOL PROPELLANTS

BACKGROUND OF THE INVENTION

The present invention relates generally to aerosol compositions and aerosol dispensing means, and is more particularly directed to an environmentally safe propellant which can be incorporated into an aerosol spray composition.

Aerosol spray compositions are widely known and used. Aerosols are generally characterized by a mixture of compositions to be delivered, which are frequently liquids, in combination with a pressurized gas, known as a propellant. Typically, compositions to be delivered or applied by aerosol means are contained within a vessel, most commonly a can, into which the pressurized gas to be used as a propellant is placed. The pressurized contents are released from the container vessel by a valve means, so that the composition to be so delivered may be released and directed as desired.

Examples of materials to be delivered by aerosol means are hair sprays, body sprays, room and insecticide sprays, polishes, lacquers, suntan sprays, shaving foams, shampoos, cleaning foams, car care sprays, condiment sprays, and silicone sprays. Such formulations, along with inert ingredients as needed, are placed into the aerosol container along with the propellant.

The propellants which have been most commonly used are chlorofluorocarbons containing one or more chlorine atoms. These propellants have been marketed under the trademarks Freon and Genetron. It is now well established that these chlorinated propellants deplete the protective ozone layer in the upper atmosphere. Accordingly, there is much emphasis on the use of alternative propellants to eliminate the environmental hazards experienced with chlorofluorocarbons. chlorofluorocarbons. However, the use of hydrocarbons has been less than successful in many applications for various reasons, primarily in that hydrocarbons tend to be highly flammable, and are therefore unsafe for many applications, including home use.

SUMMARY OF THE INVENTION

The present invention uses perfluoroalkanes, such as perfluoropropane, perfluorobutane, perfluoro-2-butene, or perfluoropentane, as a propellant in aerosol compositions. Perfluoroalkanes may be used in any aerosol formulation to dispense any liquids which are typically dispensed by aerosol means. Perfluoroalkanes may be mixed with sulphur hexafluoride to provide aerosol propellant as well.

Perfluoroalkanes are environmentally safe, non flammable, and non carcinogenic. They act as suitable propellants at pressures which fit within typical container pressure limitations for chloroflurocarbons. Where desired, sulphur hexafluoride gas may be mixed with the perfluoroalkanes.

It is acknowledged that certain odors associated with perfluoroalkanes render these propellants as being more suitable for non personal aerosol applications or for certain indoor applications. It is suggested that perfluoroalkanes are better suited for outdoor applications or in applications where odor is not a factor, such as where insecticides are involved, as opposed to applications such as aerosol deodorant sprays. Perfluoroalkane propellant formulations are particularly well suited where the electrical integrity of cables is of importance, such as underground power cables, cable housing and similar applications.

DETAILED DESCRIPTION OF THE PREFERRED EMBODIMENT

Perfluoroalkanes are used as a propellant means to dispense liquids in aerosol form. A selected perfluoroalkane is placed under pressure within a container containing a liquid or a combination of liquids to be dispensed. Releasing means, such as a valve, is normally provided as part of the container for the purpose of releasing the perfluoroalkane propellant and liquid in aerosol form. The liquid may be a combination of mixture, or a composition, and may contain active ingredients or inert ingredients as desired. Sulphur hexafluoride may be mixed with the selected perfluoroalkane.

The perfluoroalkane to be used may be selected from the group of perfluoropropane, perfluorobutane, or perfluoropentane. This particular group is selected since, when placed into a container under pressure, the vapor pressure of each member of this group causes the particular perfluoroalkane to remain a gas. The liquid to be dispensed by the propellant selected from this group will be dispensed in aerosol form, without the necessity of using an additional propellant, such as a chlorofluorocarbon. The particular perfluoroalkane to be used will be selected according to its suitability to the application. Factors to be considered are the liquid to be dispensed in aerosol form, cost, and particular application.

Perfluoroalkanes may be used as a propellant in combination with any liquid material commonly dispensed by aerosol means. However, due to its properties, such as odor, perfluoroalkanes are better suited for outdoor applications or for indoor applications where odor is not a factor.

Accordingly, the examples given herein are specific formulations of aerosol insecticides using perfluoroalkanes alone or mixed with sulphur hexafluoride as a propellant. Perfluoroalkanes could be substituted in a like fashion with other liquid materials to be dispensed by aerosol means.

EXAMPLE 1

The first example of a specific formulation is an aerosol insecticide having a water base. A typical formulation would be as follows:

| | | |
|---|---|---|
| Insecticide | .05% to | 3% |
| Synergist | .05% to | 5% |
| Isopropanol | 40% to | 70% |
| Sodium benzoate | .2% to | .5% |
| Emulsifier | .05% to | 1% |
| Water | 30% to | 70% |
| Perfluoropropane | 25% to | 30% |
| TOTAL | | 100% |

All of the above percentages are by weight.

The insecticide as given in the formulation may be a quick-killing non-residual insecticide such as pyrethrin or synthetic pyrethrum, or an insecticide which is residual such as organo phosphates (e.g. chlorpyrifos phosphorotioate) or carbamates, including those marketed under the trademarks Baygon[1], Baytex[2], Dursban[3], Vapona[4], or Rotenone. Insecticide could be any insecticide presentable in liquid form.

[1] Registered trademark of Farben Fabricken Bayer GmbH, Levekusen, Germany
[2] Registered trademark of Farben Fabricken Bayer GmbH, Levekusen, Germany
[3] Registered trademark of Dow Chemical Company.
[4] Registered trademark of the Shell Oil Company.

The synergist may be piperonyl butoxide or a mixture of piperonyl butoxide and n-octyl-5-norbonene-2,3-dicarboximide. The function of the synergist is to increase the insecticidal activity so as to reduce the quantity of insecticide required, and to reduce the overall formulation cost. Sodium benzoate is added as a corrosion inhibitor. Isopropanol is added as a solvent for complete mixing of water and insecticide.

The emulsifier may be a mixture of non-ionic and anionic surfactants, more specifically 1 to 300 moles of ethylene oxide to a substance selected from the group consisting of castor oil, Hydrogenated castor oil and lanolin. The emulsifier may be sodium neutralized methylene sulphonic acid condensed and mixed with ethyleneoxide propyleneoxide block co-polymer (1:1).

The particular propellant which is selected in this formulation is perfluoropropane. This particular perfluoroalkane is chosen because of vapor pressure considerations for filling and transportation of insecticide aerosols. The propellant could be any of the perfluoroalkanes, from the group perfluoropropane, perfluorobutane, or perfluoropentane, since at least 80 p.s.i.a. pressure is established at 70 degrees F., due to the vapor pressure of this group. The particular perfluoroalkane acts not only as a propellant, but since it remains a gas when placed into a container under pressure, yields the required dispensation of the liquid as an aerosol, without the use of chlorofluorocarbons or other additional propellants.

EXAMPLE 2

A second specific example for an aerosol insecticide is given as an oil base formulation:

| Insecticide | .05% to | 3% |
| --- | --- | --- |
| Synergist | 1.0% to | 5% |
| Petroleum oil, refined | 15% to | 20% |
| Perfluoroalkane | 62% to | 70% |
| TOTAL | | 100% |

All of the above percentages are indicated by weight.

The insecticides may again include the residual and nonresidual insecticides given above in Example 1. The synergist would be piperonyl butoxide in a recommended range of 1% to 5% by weight, or n-octyl-5-norbonene-2,3-dicarboximide in the recommended range of 2% to 5% by weight.

In any aerosol formulation, the particle size should be less than 50 microns. The examples given are herein, when properly packaged, will produce a preferred aerosol particle size of 15 to 30 microns.

The group of perfluroalkanes as disclosed herein may be used as aerosol propellants with most any liquid. As with the other propellants, the range of propellant to the total formulation will range from approximately 8% to 92% by weight.

These perfluoroalkanes are suitable for use as a propellant in aerosol formulations. These perfluoroalkanes provide an alternative to chlorinated propellants with no resulting environmental hazards. Perfluoroalkanes comply with environmental safety codes and are not believed to be carcinogenic.

The sulfur hexafluoride may be combined with any of the formulations where dielectric strength of the composition is desired.

What is claimed is:

1. An aerosol spray composition contained within an aerosol container, comprising:
   a. a liquid material to be sprayed; and
   b. a pressurized propellant gas comprising a perfluoroalkane selected from a group consisting of perfluorobutane, perfluoropropane, and perfluoropentane, wherein the pressure of the propellant gas so contained is at least 80 pounds per square inch at 70° F., and wherein said liquid material is sprayed in aerosol form upon release of said propellant gas.

2. An aerosol spray composition contained within an aerosol container as described in claim 1, comprising:

| Active ingredients | .05% to | 5% |
| --- | --- | --- |
| Inert ingredients | 18% to | 75% |
| Propellant Gas | 20% to | 72% |
| | | 100% | wherein said percentages are by weight.

3. An aerosol spray composition contained within an aerosol container as described in claim 2, wherein said propellant gas is a mixture of sulfur hexafluoride and a perfluoroalkane selected from a group consisting of perfluorobutane, perfluoropropane, and perfluoropentane.

4. An aerosol spray composition contained within an aerosol container as described in claim 1, wherein said liquid material to be sprayed is an insecticide.

5. An aerosol spray composition contained within an aerosol container as described in claim 2, wherein said active ingredients are insecticides.

6. An aerosol spray composition contained within an aerosol container as described in claim 3, wherein said active ingredients are insecticides.

7. An aerosol spray composition contained within an aerosol container as described in claim 1, further comprising sulphur hexafluoride as a propellant.

8. An aerosol spray composition contained within an aerosol container as described in claim 2, further comprising sulphur hexafluoride as a propellant.

9. An aerosol spray composition contained within an aerosol container as described in claim 3, further comprising sulphur hexafluoride as a propellant.

10. An aerosol spray composition contained within an aerosol container as described in claim 4, further comprising sulphur hexafluoride as a propellant.

11. An aerosol spray composition contained within an aerosol container as described in claim 5, further comprising sulphur hexafluoride as a propellant.

12. An aerosol spray composition contained within an aerosol container as described in claim 6, further comprising sulphur hexafluoride as a propellant.

13. An aerosol spray composition contained within an aerosol container, comprising:
   a. a liquid material to be sprayed; and
   b. a pressurized propellant gas comprising a perfluoroalkane selected from a group consisting of perfluorobutane, perfluoropropane, and perfluoropentane, wherein the pressure of the propellant gas so contained is at least 80 pounds per square inch at 70° F., and wherein said liquid material is sprayed in aerosol form having a particle size of 15 to 30 microns upon release of said propellant gas.

14. An aerosol spray composition contained within an aerosol container as described in claim 13, comprising:

| Active ingredients | .05% to 5% |
|---|---|
| Inert ingredients | 18% to 75% |
| Propellant Gas | 20% to 72% |
| | 100% | wherein said percentages are by weight.

15. An aerosol spray composition contained within an aerosol container as described in claim 14, wherein said propellant gas is a mixture of sulfur hexafluoride and a perfluoroalkane selected from a group consisting of perfluorobutane, perfluoropropane, and perfluoropentane.

16. An aerosol spray composition contained within an aerosol container as described in claim 13, wherein said liquid material to be sprayed is an insecticide.

17. An aerosol spray composition contained within an aerosol container as described in claim 14, wherein said active ingredients are insecticides.

18. An aerosol spray composition contained within an aerosol container as described in claim 15, wherein said active ingredients are insecticides.

19. An aerosol spray composition contained within an aerosol container as described in claim 13, further comprising sulphur hexafluoride as a propellant.

20. An aerosol spray composition contained within an aerosol container as described in claim 14, further comprising sulphur hexafluoride as a propellant.

21. An aerosol spray composition contained within an aerosol container as described in claim 15, further comprising sulphur hexafluoride as a propellant.

22. An aerosol spray composition contained within an aerosol container as described in claim 16, further comprising sulphur hexafluoride as a propellant.

23. An aerosol spray composition contained within an aerosol container as described in claim 17, further comprising sulphur hexafluoride as a propellant.

24. An aerosol spray composition contained within an aerosol container as described in claim 18, further comprising sulphur hexafluoride as a propellant.

* * * * *